US005522304A

United States Patent [19]

Kampichler et al.

[11] Patent Number: 5,522,304

[45] Date of Patent: Jun. 4, 1996

[54] DRIVER FOR AN INJECTION PUMP

[75] Inventors: Günter Kampichler; Herbert Geier, both of Ruhstorf/Rott, Germany

[73] Assignee: Motorenfabrik Hatz GmbH & Co. KG, Ruhstorf/Rott, Germany

[21] Appl. No.: 335,802

[22] PCT Filed: Feb. 23, 1994

[86] PCT No.: PCT/EP94/00508

§ 371 Date: Nov. 14, 1994

§ 102(e) Date: Nov. 14, 1994

[87] PCT Pub. No.: WO94/20747

PCT Pub. Date: Sep. 15, 1994

[30] Foreign Application Priority Data

Mar. 11, 1993 [DE] Germany .......................... 43 07 700.5

[51] Int. Cl.$^{6}$ ................................ F16J 1/10; F04B 17/00

[52] U.S. Cl. .............................. 92/129; 74/105; 417/360; 403/375

[58] Field of Search .............................. 92/129; 417/360, 417/470, 471; 403/331, 375; 74/102, 105

[56] References Cited

U.S. PATENT DOCUMENTS

| | | | |
|---|---|---|---|
| 1,957,669 | 5/1934 | Rockwell | 417/471 X |
| 1,957,753 | 5/1934 | Babitch | 417/471 X |
| 1,995,507 | 3/1935 | Harry et al. | 92/129 |
| 3,186,350 | 6/1965 | Fitzgerald | 417/471 X |
| 3,741,022 | 5/1973 | Olson et al. | 74/102 |
| 4,234,292 | 11/1980 | Berg . | |
| 4,352,586 | 10/1982 | Hayden | 403/375 X |
| 4,535,641 | 8/1985 | Kriz et al. . | |
| 5,174,734 | 12/1992 | Thomas et al. | 417/490 |

FOREIGN PATENT DOCUMENTS 3500523 7/1985 Germany .

*Primary Examiner*—John E. Ryznic

[57] ABSTRACT

A driver, used as a link between a piston of an injection pump and a drive element which rests freely against the end of the piston nearest the driver and moves with the piston, is attached to the drive element in such a way that, in order to establish the link between the piston and the drive element, the driver can be rotated over the widened face of a baseplate located at the end of the piston until it reaches a final position in which it is secured by the fact that it grips the piston.

9 Claims, 3 Drawing Sheets

DRIVER FOR AN INJECTION PUMP

This application is a Rule 371 of PCT/EP94/00508 filed on Feb. 23, 1994.

BACKGROUND OF THE INVENTION

The invention relates to a driver as a connection between the piston of an injection pump and a driving element moved loosely against the end of the piston nearest the drive in accordance with the lift of the piston, the piston end being formed by a widened base plate and the driver being pivotably fastened to the driving element.

Such a driver is disclosed in the DE-C-2723969. It has a sliding groove, into which the prepared base plate of the piston of the injection pump is introduced without clearance. The driver comprises a push rod, which runs in a longitudinal guide and is connected over a connecting rod in a hinged fashion with a rocking lever. The cost of manufacturing of a driver, so guided, is appreciable.

SUMMARY OF THE INVENTION

It is an object of the present invention to provide a special driver, with which a direct connection can be produced in a simple manner between the piston end and a driving element, which is provided on the engine side. The driver is to consist of a component, which can easily be produced and installed and ensures reliable functioning even when the plunger return spring of the injection pump is replaced by an appropriately elastic driving element pressing against the driver.

According to the invention, the above object is accomplished by that, for establishing the connection, the driver, fastened to the driving element, can be swiveled over the rear of the base plate until it reaches an end position, in which it is secured by embracing the piston. In its end position, the driver sees to it that the connection between the piston and the driving element, which acts directly on the piston, which in turn is guided in the pump cylinder, is almost free of play.

Because the driver is fastened to the driving element and as a result of the possibility of establishing its connection with the piston end by a simple swiveling of the driver, the installation of the injection pump at the engine is particularly simple. After the widened base plate of the piston is brought into a position in which it is in contact with the driving element, the driver, pivotably fastened to the driving element, is simply swiveled over the base plate, so that it grips over the rear of the base plate and prevents the latter from being lifted from the driving element when the engine is operating.

The invention is suitable particularly for small diesel engines, for which great importance is attached to being able to use injection pumps of particularly simple construction, for example, those which make do without the usual driving push rod with spring-loaded linear guidance.

In a further development of the invention, the driver has a transverse part, which grips behind the base plate of the piston and is provided with slots or openings for the entry of the piston end between the transverse part and the driving element. Such a transverse part enables the piston end, which is constructed with the widened base plate, and the driving element to be assembled in a simple manner in that the piston end passes through the slots or openings in the transverse part of the driver, before the driver is swiveled into the end position.

To secure the connection, spring-mounted projections are provided on the transverse part and, in the end position of the swiveling motion, laterally grip behind the piston and hold it in position by the spring-mounted projections. These projections thus are deformed during the swiveling motion, in that they are expanded appropriately by the piston in order then to grip the piston once again by the spring action, so that the driver is fixed in the final swiveling position corresponding to its working position.

A driver of particularly simple construction, at least, as far as the transverse part is concerned, is constructed as a sheet metal stamping. The transverse part advantageously consists of two sheet metal brackets, which are bent into a parallel position with little distance between them, the first of which grips directly over the rear of the base plate and the second of which carries the elastic projections.

The first sheet metal bracket has a keyhole-shaped elongated hole, the expanded part of which makes it possible to thread the base plate and the narrow part of which is dimensioned to correspond to the piston diameter. The starting position for the assembly therefore is an appropriately inclined position of the transverse part, so that the piston can be extended in a straight line with its base plate through the widened part of the elongated hole until it comes to lie against the driving element. After that, the driver is swiveled over the base plate and fixed in the final working position, in that the second sheet metal bracket has a slot, which is open against the swiveling direction and, relative to the end position of the swiveling motion, is expanded after a constriction formed by the elastic projections into a round hole, the diameter of which corresponds approximately to that of the piston.

Preferably, the whole of the driver is constructed as a sheet metal stamping in that, on opposite sides of the transverse parts, bearing plates are integrally molded, which are bent in planes perpendicular to the swiveling axis and have appropriate swivel bearing boreholes. If the driving element advantageously comprises a back-pressure roll, then the bearing bolt of this roll at the same time is available for supporting the driver by means of the swivel bearing boreholes of the bearing plates.

To facilitate the swiveling installation and also for versions of the driver, the elastic deformability of which is only limited, it may be advantageous to construct the transverse part and the base plate spherically at least on their mutually assigned sides corresponding to the swiveling path of the driver.

In the following, an embodiment of the invention is explained by means of the accompanied drawings

DETAILED DESCRIPTION OF THE PREFERRED EMBODIMENT

Figure 1:
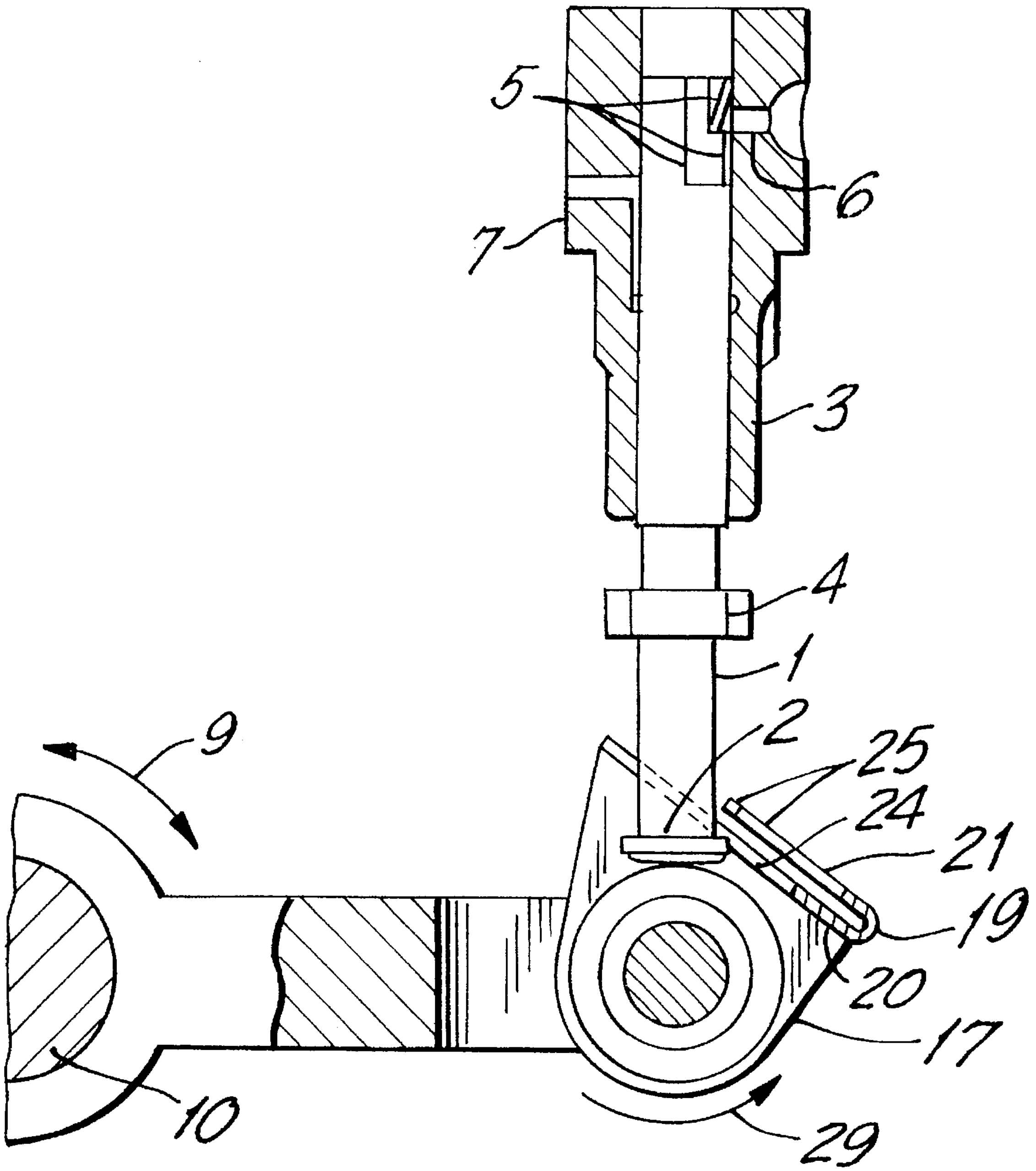
FIG. 1 shows an axial longitudinal section through an injection pump with assigned rocker arm and with the driver.

The Figures of the drawing show only a piston 1 with a widened base plate 2 and a cylinder 3 of an injection pump.

Outside of the cylinder 3, the piston has a shoulder 4 for connecting a control rod (not shown). The different control curves 5, by means of which the flow of fuel is controlled in accordance with the piston lift and the piston rotation brought about by the control system, are formed at the end of the piston 1 opposite the base plate 2. A borehole 6 for the fuel flowing in and the borehole 7 for the fuel flowing out are drawn in the cylinder 3.

Figure 3:
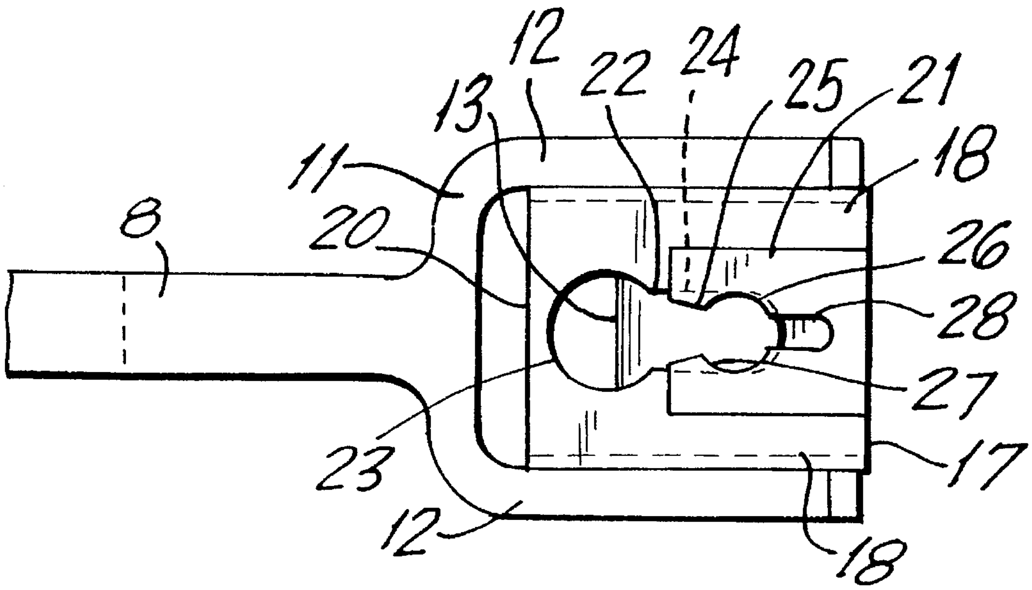
FIG. 3 shows a plan view of FIG. 2 without the piston.
Figure 4:
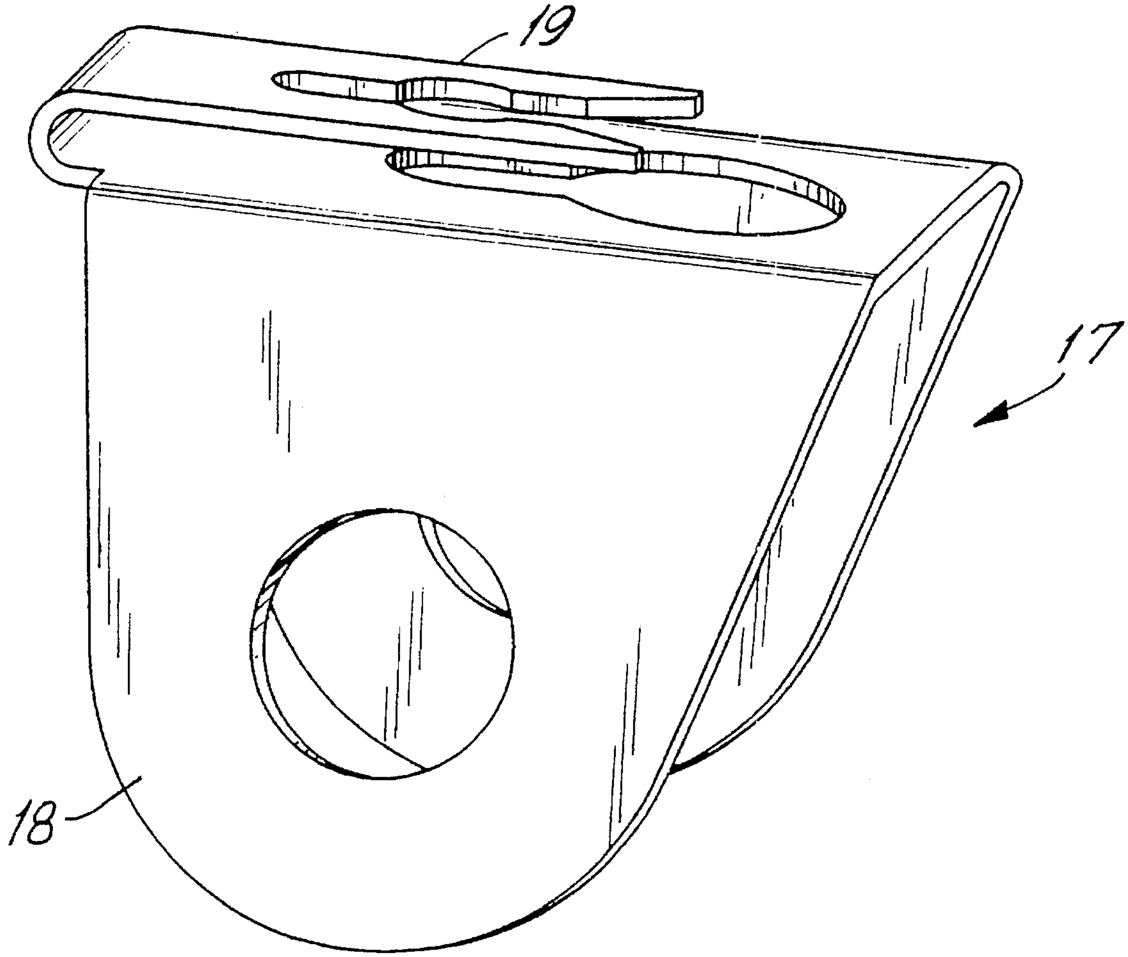
FIG. 4 is a perspective detail view of the driver.

The stroke of the piston 1 arises from the pivoting motion of a rocker arm 8 in the direction of the double arrow 9 about swiveling axis 10. At the end of the rocker arm 8, there is a fork 11 (FIG. 3), between fingers 12 of which a back-pressure roll 13, which can be rotated about a pin 14, is mounted. The back-pressure roll has an outer ring 15 and an inner ring 16, which are disposed coaxially to one another and, through their bearing clearance, ensure improved tolerance compensation.

A driver 17 is mounted over appropriate swivel bearing boreholes in its lateral bearing plates 18 on the swivel pin 14. The bridge between the bearing plates forms a transverse part 19, which consists of two sheet metal brackets 20, which are bent into a parallel position to one another. The first sheet metal bracket 20 has a keyhole-shaped elongated hole 22, the expanded part 23 of which enables the base plate 2 of the piston 1 to be insertion in and the narrow part 24 of which is dimensioned to correspond to the diameter of the piston 1.

The second sheet metal bracket 21 has a slot 25, which is open against the swiveling direction and has, relative to the end position of the swiveling motion of the driver 17, a constriction formed by the elastic projections 26 and, adjoining this constriction, a round hole 27 corresponding to the diameter of the piston. To improve the elastic properties, the slot 25 also has a narrow elongation 28, which makes it easier for the projections 26 to slip over the piston 1 and, at the same time, spring back. The second sheet metal bracket 21 is shorter than the first sheet metal bracket 20, so as not to interfere with the threading of the piston end into the elongated hole 22 of said bracket 20.

Figure 2:
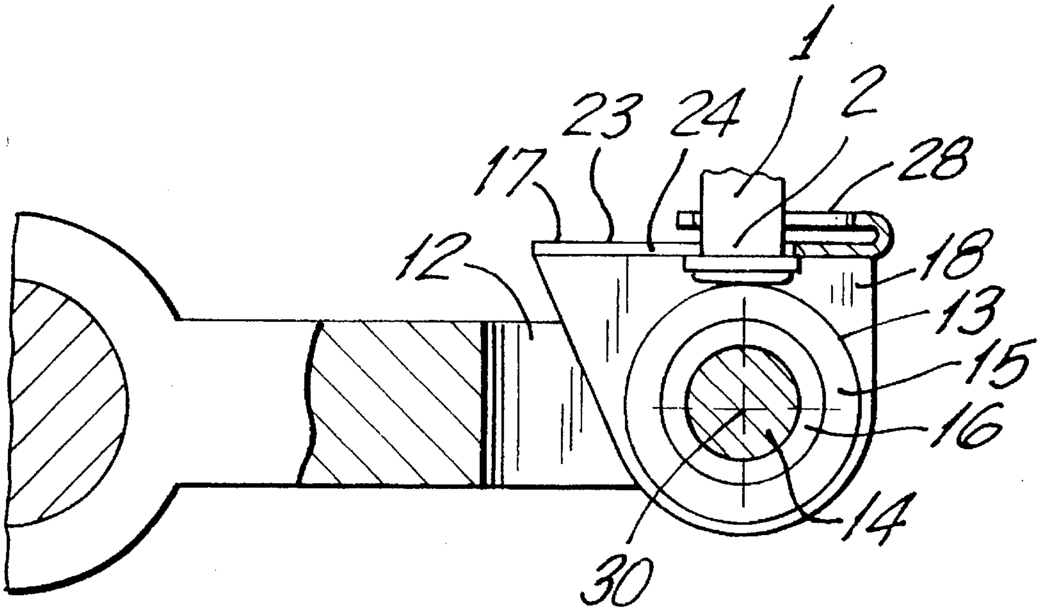
FIG. 2 shows the representation of FIG. 1 with the end position of the driver.

In FIGS. 1 and 2, on the one hand, the starting position of the driver 17 and, on the other, the end position of the installation of the driver are shown, that is, the driver 17 is moved in accordance with arrow 29 from the starting position (FIG. 1) into the final position (FIG. 2), which corresponds to the operating position of the engine.

The swiveling installation of the driver 17 about its swiveling axis 30, which has been described, enables the base plate 2 of the piston 3 to be assigned to the back-pressure roll 13 without any impediments. In this connection, it may be assumed that, during the installation, the axes of these components are fixed from the start, that is, the rocker arm 13 can be swiveled only about its swiveling axis, and the piston 1 can be moved only in the direction of the piston stroke.

For the selected embodiment of the driver 17, there is no need for any additional manipulations after the driver 17 is swiveled into place, that is, the installation measures are reduced to a minimum. At the same time, with respect to the clearances of the swivel bearing boreholes in the lateral bearing plates 18 of the driver 17, it should be noted that, in the end position of the driver 17, the base plate 2 of the piston 1 has a slight clearance of 0.05 to 0.1 mm between the first sheet metal bracket 20 and the back-pressure roll 13.

We claim:

1. A driver link for an injection pump, and forming a connection between a piston (1) of the injection pump and a driving element moved loosely against an end of the piston nearest the driver link in accordance with the lift of the piston, comprising a driver (17), the end of the piston being formed by a widened base plate (2), said driver (17) being pivotably connected to the driving element, and positioned to be swiveled over a rear of the base plate (2) until it reaches an end position, in which it is secured by embracing the piston (1).

2. The driver link of claim 1, wherein said driver has a transverse part (19), which grips behind the base plate (2) of the piston (1) and is provided with slots or openings for an entry of the end of the piston between the transverse part (19) and the driving element.

3. The driver link of claim 2, wherein said transverse part (19) is constructed as a sheet metal stamping.

4. The driver link of claim 3, wherein said transverse part (19) consists of two sheet metal brackets (20, 21), which are bent into a parallel position with a distance therebetween, of which a first sheet metal bracket (20) grips directly over the rear of the base plate (2) and a second sheet metal bracket (21) carries the elastic projections (26).

5. The driver link of claim 4, wherein the first sheet metal bracket (20) has a keyhole-shaped elongated hole (22) having an expanded part (23) which makes it possible to insert the base plate (2) into the driver and a narrow part (24) which is dimensioned to correspond to a piston diameter.

6. The driver link of claim 5, wherein the second sheet metal bracket (21) has a slot (25), which is open against the swiveling direction and, relative to the end position of the swiveling motion, and is expanded after a constriction formed by the elastic projections (26) into a round hole (27), a diameter of which corresponds approximately to that of the piston.

7. The driver link of claim 3, wherein said driver further includes bearing plates (18), which are bent in planes perpendicular to a swiveling axis (30) and having respective swivel bearing boreholes and are integrally molded on opposite sides of the transverse part (19).

8. The driver link of claim 2, wherein the transverse part (19) and the base plate (2) are constructed spherically at least on mutually assigned sides thereof in correspondence with a swiveling path of the driver (17).

9. The driver link of claim 1, wherein, to secure the connection, elastic projections (26) are provided at the transverse part (19) and, in the end position of a swiveling motion of said driver, said elastic projections (26) laterally grip behind the piston (1) and hold the piston in position by a spring action.

* * * * *